United States Patent
Nakane et al.

(10) Patent No.: US 12,216,826 B2
(45) Date of Patent: Feb. 4, 2025

(54) TACTILE PRESENTATION DEVICE, TACTILE PRESENTATION SYSTEM, CONTROL DEVICE, AND NON-TRANSITORY COMPUTER-READABLE MEDIUM

(71) Applicant: KABUSHIKI KAISHA TOKAI RIKA DENKI SEISAKUSHO, Aichi (JP)

(72) Inventors: Keita Nakane, Aichi (JP); Takeshi Ohnishi, Aichi (JP); Masahiro Wasai, Aichi (JP); Mayu Myokan, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 94 days.

(21) Appl. No.: 18/013,710

(22) PCT Filed: Jun. 23, 2021

(86) PCT No.: PCT/JP2021/023741
§ 371 (c)(1),
(2) Date: Dec. 29, 2022

(87) PCT Pub. No.: WO2022/004517
PCT Pub. Date: Jan. 6, 2022

(65) Prior Publication Data
US 2023/0315205 A1    Oct. 5, 2023

(30) Foreign Application Priority Data
Jul. 1, 2020  (JP) .................................. 2020-114178

(51) Int. Cl.
*G06F 3/01*     (2006.01)
*G06F 3/03*     (2006.01)
(Continued)

(52) U.S. Cl.
CPC ............ *G06F 3/016* (2013.01); *G06F 3/0321* (2013.01); *G06F 3/0346* (2013.01); *G06F 3/03545* (2013.01); *G06F 3/0441* (2019.05)

(58) Field of Classification Search
CPC ...... G06F 3/016; G06F 3/0321; G06F 3/0346; G06F 3/03545; G06F 3/0441
See application file for complete search history.

(56) References Cited

U.S. PATENT DOCUMENTS

| 10,061,385 B2 * | 8/2018 | Churikov ................ G06F 3/016 |
| 2002/0107885 A1 * | 8/2002 | Brooks ................ G06F 40/174 |
| | | 715/224 |

(Continued)

FOREIGN PATENT DOCUMENTS

| DE | 102017111144 | 11/2018 |
| EP | 2230583 | 9/2010 |

(Continued)

OTHER PUBLICATIONS

"Reading Robots for Chinese Learning," <URL=https://lahlahbanana.com/2020/03/11/reading-robots-for-chinese-learning/>, last accessed Jun. 13, 2024 (Year: 2020).*

(Continued)

*Primary Examiner* — James T Tsai
(74) *Attorney, Agent, or Firm* — Greenblum & Bernstein, P.L.C.

(57) ABSTRACT

A hosing has a shape capable of being held by a user. A reading device is installed in the housing and configured to read identification information that is associated with a position in a media content. A vibration source is installed in the housing and capable of generating vibration. A control device is installed in the housing and configured to cause the (Continued)

vibration source to generate vibration corresponding to vibration waveform information that is associated with the identification information.

11 Claims, 5 Drawing Sheets

(51) Int. Cl.
*G06F 3/0346* (2013.01)
*G06F 3/0354* (2013.01)
*G06F 3/044* (2006.01)

(56) References Cited

U.S. PATENT DOCUMENTS

| | | | |
|---|---|---|---|
| 2006/0154559 A1* | 7/2006 | Yoshida | A63H 33/22 |
| | | | 446/297 |
| 2006/0159345 A1* | 7/2006 | Clary | G06V 30/1448 |
| | | | 715/268 |
| 2010/0090815 A1* | 4/2010 | Yamaya | G06F 3/016 |
| | | | 345/173 |
| 2012/0105653 A1 | 5/2012 | Yoshida | |
| 2014/0167941 A1* | 6/2014 | Rank | G06F 3/016 |
| | | | 340/407.1 |
| 2014/0168124 A1 | 6/2014 | Park et al. | |
| 2014/0340326 A1* | 11/2014 | Kameyama | G06F 3/03545 |
| | | | 345/173 |
| 2014/0340328 A1* | 11/2014 | Kameyama | G06F 3/03545 |
| | | | 345/173 |
| 2017/0003760 A1 | 1/2017 | Yoshida | |
| 2017/0004337 A1 | 1/2017 | Yoshida | |
| 2017/0004338 A1 | 1/2017 | Yoshida | |
| 2017/0004339 A1 | 1/2017 | Yoshida | |
| 2017/0011244 A1 | 1/2017 | Yoshida | |
| 2017/0084139 A1 | 3/2017 | Rank et al. | |
| 2017/0277285 A1* | 9/2017 | Chung | G06F 3/03545 |
| 2017/0364167 A1 | 12/2017 | Ribeiro et al. | |
| 2018/0081456 A1* | 3/2018 | Li | G06F 3/0383 |
| 2019/0066459 A1 | 2/2019 | Rank et al. | |
| 2019/0094974 A1 | 3/2019 | Hayashi | |
| 2019/0380792 A1* | 12/2019 | Poltaretskyi | G09B 23/28 |
| 2019/0384402 A1* | 12/2019 | Huizar | G06F 3/03545 |
| 2020/0019258 A1 | 1/2020 | Akama et al. | |
| 2020/0285318 A1* | 9/2020 | Taylor | G06F 3/038 |

FOREIGN PATENT DOCUMENTS

| | | |
|---|---|---|
| JP | d 11-85400 | 3/1999 |
| JP | h 2007-115291 | 5/2007 |
| JP | C 2011-8532 | 1/2011 |
| JP | g 2012-226452 | 11/2012 |
| JP | b 2013-61766 | 4/2013 |
| JP | i 2013-76720 | 4/2013 |
| JP | e 2014-120170 | 6/2014 |
| JP | 2014-222492 | 11/2014 |
| JP | f 2014-222488 | 11/2014 |
| JP | 2020-6020 | 1/2020 |
| WO | a 2008/078523 | 7/2008 |

OTHER PUBLICATIONS

Office Action issued in Corresponding JP Patent Application No. 2020-114178, dated Jan. 16, 2024, along with an English translation thereof.

International Search Report Issued in International Patent Application No. PCT/JP2021/023741, dated Sep. 7, 2021, Along with an English translation thereof.

* cited by examiner

TACTILE PRESENTATION DEVICE, TACTILE PRESENTATION SYSTEM, CONTROL DEVICE, AND NON-TRANSITORY COMPUTER-READABLE MEDIUM

FIELD

The presently disclosed subject matter relates to a device and system for presenting a tactile sensation to a user with a vibration source. The presently disclosed subject matter also relates to a control device for causing the vibration source in the device or system to generate vibration. The presently disclosed subject matter also relates to a non-transitory computer-readable medium having stored a computer program adapted to be executed by a processor installed in the control device.

BACKGROUND

WO 2008/078523 A1 discloses an electronic input device simulating a writing tool as an example of a tactile presentation device. The device includes a vibration source configured to generate, in response to detection of a writing operation performed by a user, vibration corresponding to the operation. With the vibration, a tactile sensation is presented to the user as if handwritten is exhibited.

SUMMARY

It is demanded to provide a new application of the tactile presentation technique.

In order to meet the demand described above, tactile presentation device, comprising:
 a hosing having a shape capable of being held by a user;
 a reading device installed in the housing and configured to read identification information that is associated with a position in a media content;
 a vibration source installed in the housing and capable of generating vibration; and
 a control device installed in the housing and configured to cause the vibration source to generate vibration corresponding to vibration waveform information that is associated with the identification information.

In order to meet the demand described above, an illustrative aspect of the presently disclosed subject matter provides a control device adapted to be installed in a tactile presentation device having a shape capable of being held by a user, the control device comprising:
 a reception interface configured to receive identification information that is associated with a position in a media content; and
 a processor configured to cause a vibration source to generate vibration corresponding to vibration waveform information that is associated with the identification information.

In order to meet the demand described above, an illustrative aspect of the presently disclosed subject matter provides a non-transitory computer-readable medium having stored a computer program adapted to be executed by a processor installed in a control device that is adapted to be installed in a tactile presentation device having a shape capable of being held by a user, the computer program being configured to, when executed, to cause the control device to:
 receive identification information that is associated with a position in a media content; and
 cause a vibration source to generate vibration corresponding to vibration waveform information that is associated with the identification information.

In order to meet the demand described above, an illustrative aspect of the presently disclosed subject matter provides a tactile presentation system, comprising:
 a display device capable of displaying a media content;
 a locating device having a shape capable of being held by a user and configured to designate a position in the media content;
 a position detector installed in the display device and configured to output position information corresponding to a position in the media content that is designated by the locating device;
 a vibration source installed in the locating device;
 a storage device storing vibration waveform information that is associated with the position information; and
 a control device configured to cause the vibration source to generate vibration corresponding to the vibration waveform information.

In order to meet the demand described above, an illustrative aspect of the presently disclosed subject matter provides a control device, comprising:
 a reception interface configured to receive position information corresponding to a position in a media content that is displayed by a display device and designated by a locating device; and
 a processor configured to cause a vibration source to generate vibration corresponding to vibration waveform information that is associated with the position information.

In order to meet the demand described above, an illustrative aspect of the presently disclosed subject matter provides a non-transitory computer-readable medium having stored a computer program adapted to be executed by a processor installed in a control device, the computer program being configured to, when executed, to cause the control device to:
 receive position information corresponding to a position in a media content that is displayed by a display device and designated by a locating device; and
 cause a vibration source to generate vibration corresponding to vibration waveform information that is associated with the position information.

According to the configuration of each of the illustrative aspects, the tactile sensation to be presented a user through the vibration source can be exhibited or changed in association with the position in the media content. As a result, as a new application of the tactile presentation technique, it is possible to provide a user with an interesting experience related to media contents.

DESCRIPTION OF EMBODIMENTS

Exemplary embodiments will be described in detail below with reference to the accompanying drawings. In each of the drawings used in the following description, the scale is appropriately changed in order to make each of the members have a recognizable size.

Figure 1:
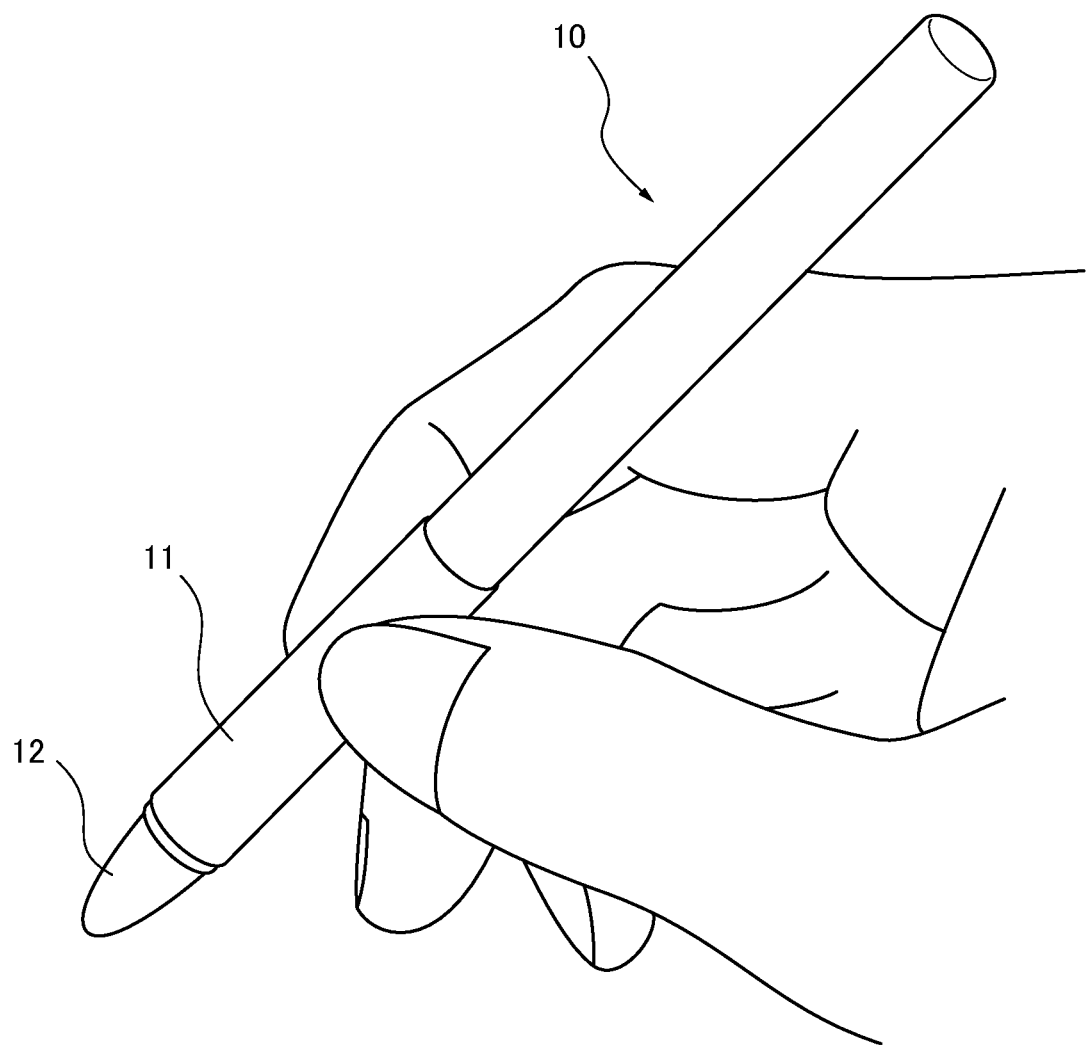
FIG. 1 illustrates a tactile presentation device according to a first embodiment.

FIG. 1 illustrates a tactile presentation device 10 according to a first embodiment. The tactile presentation device 10 includes a housing 11 having a shape capable of being held by a user. In this example, the housing 11 has a shape capable of being held by fingers of a user, but may have a shape capable of being held by a hand, or may have a shape capable of being held by another body part.

Figure 2:
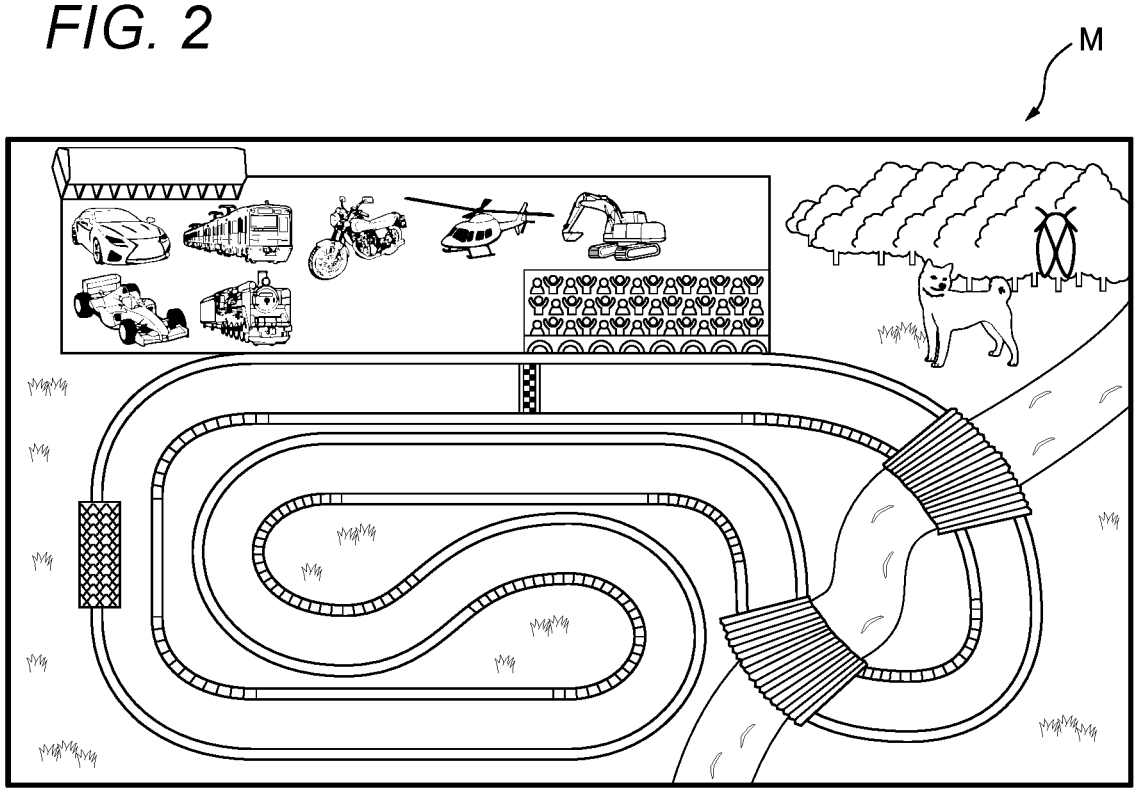
FIG. 2 illustrates an exemplary media content.
Figure 3:
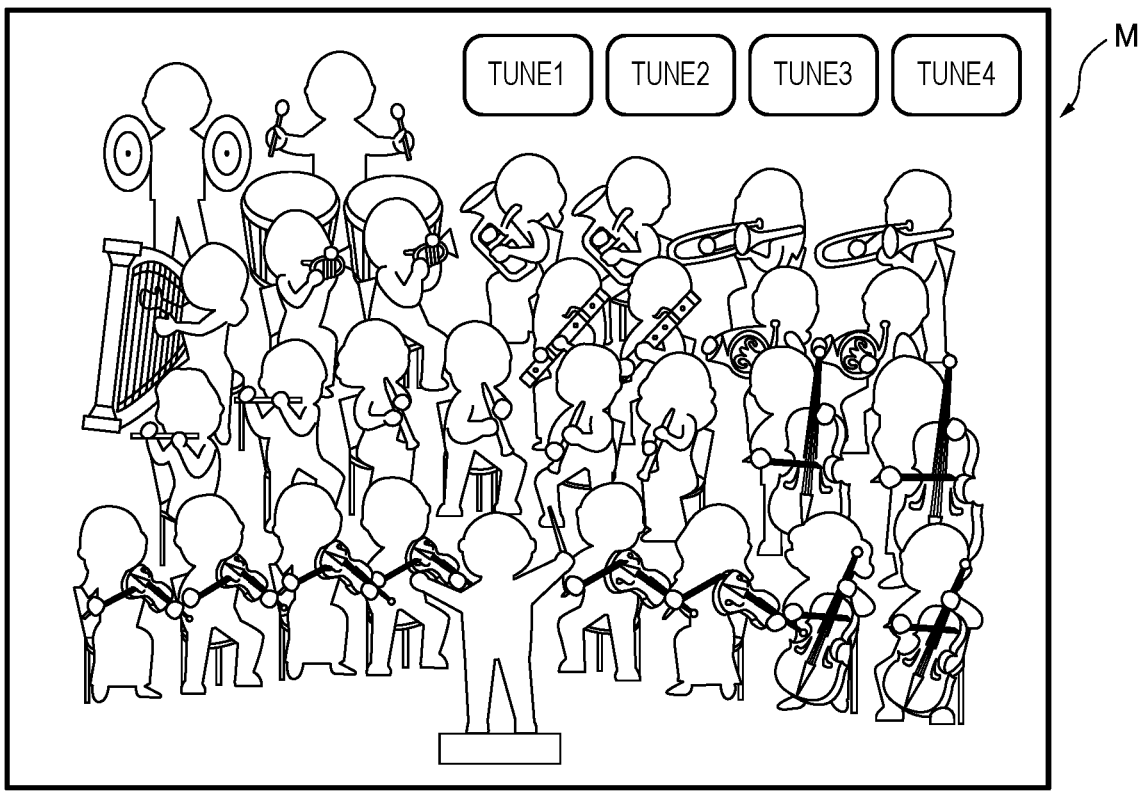
FIG. 3 illustrates another exemplary media content.
Figure 4:
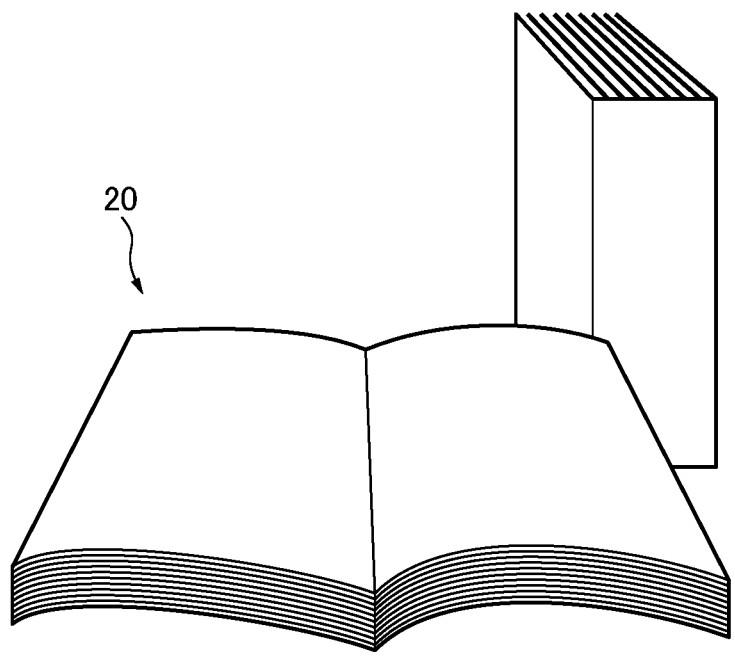
FIG. 4 illustrates a book providing a media content.
Figure 5:
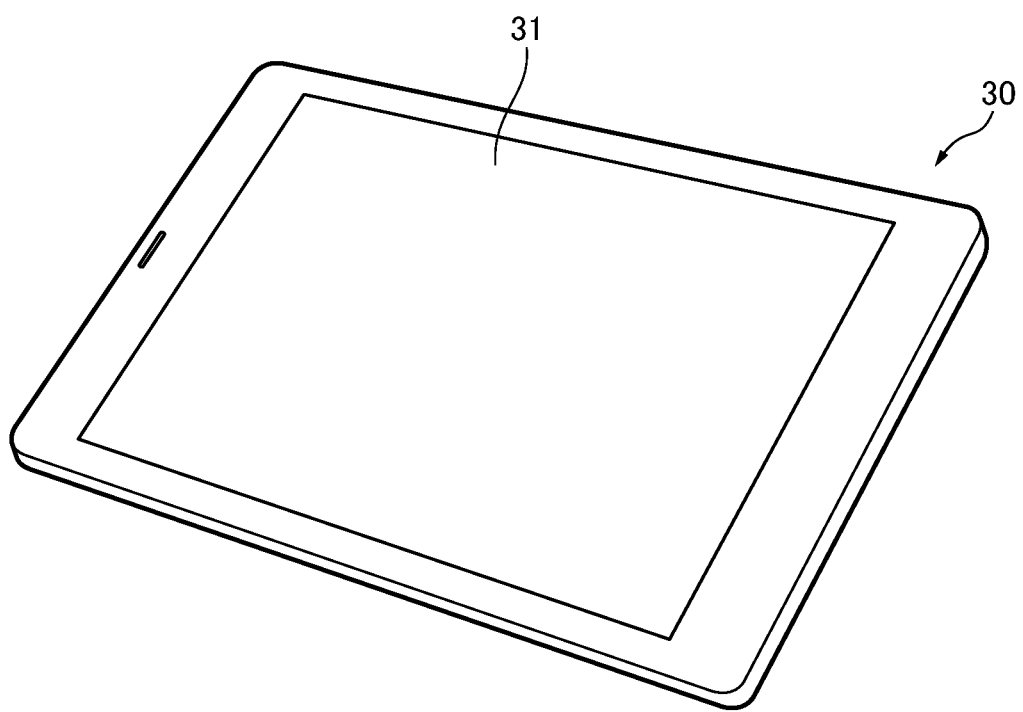
FIG. 5 illustrates a display device providing a media content.

The user causes the tactile presentation device 10 to approach a specific position in media contents M illustrated in FIGS. 2 and 3 to receive a presentation of vibration corresponding to a content at that position. The media content M may be printed on a book 20 as illustrated in FIG. 4, or may be displayed on a screen 31 of a display device 30 as illustrated in FIG. 5.

Identification information is provided on the media content M in a manner that would not obstruct visual recognition of the content. The identification information is provided in the form of an optically readable code. Examples of such identification information include a one-dimensional code such as a bar code, and a two-dimensional code such as a QR code (registered trademark) or a Grid Onput (registered trademark). The identification information is prepared so as to include at least information for specifying a position in the media content M.

Figure 6:
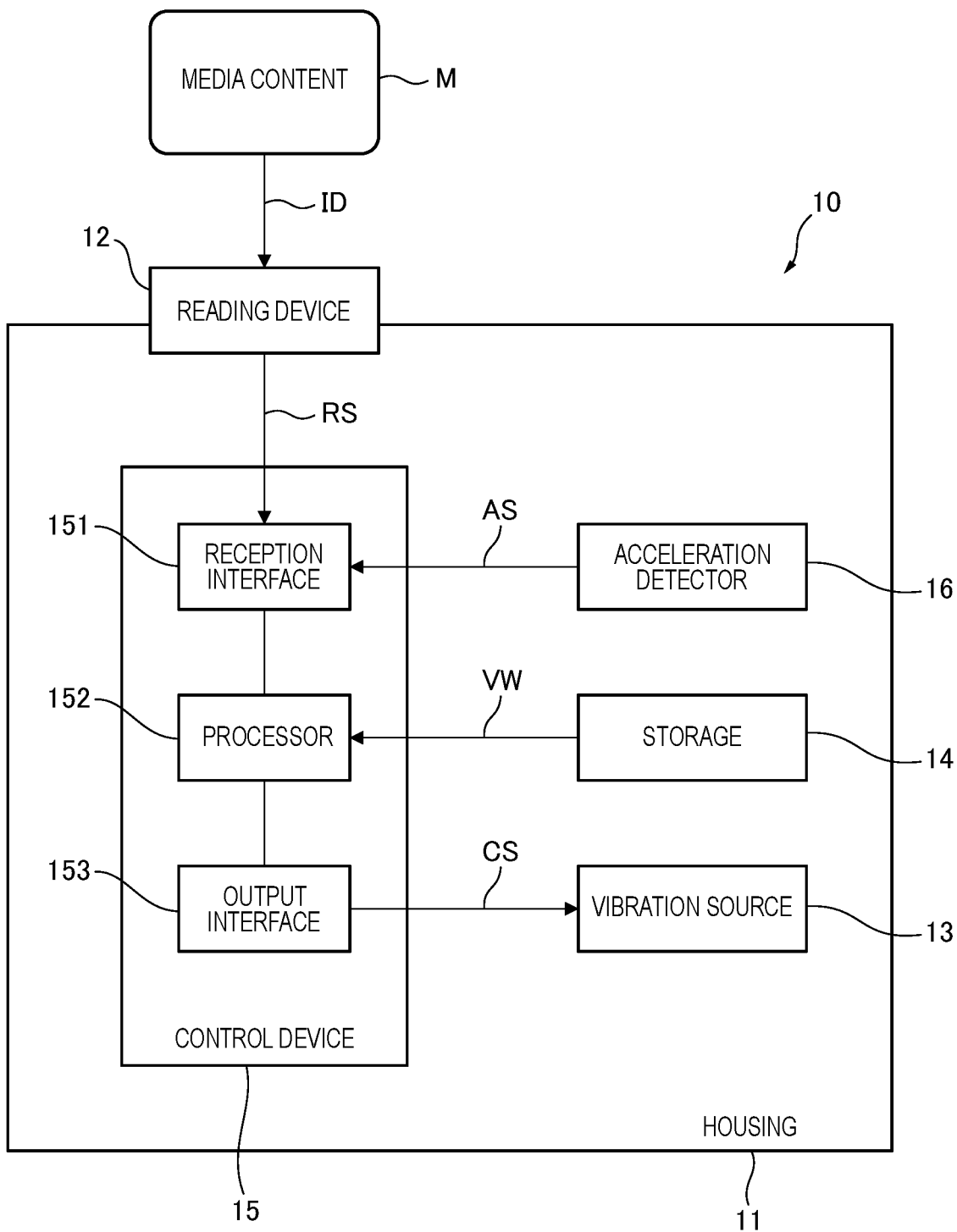
FIG. 6 illustrates a functional configuration of the tactile presentation device of FIG. 1.

FIG. 6 illustrates a functional configuration of the tactile presentation device 10. The tactile presentation device 10 includes a reading device 12. The reading device 12 is installed in the housing 11. The reading device 12 has a configuration capable of optically reading the identification information ID provided on the media content M. For example, in a case where the identification information ID is printed on the book 20 with carbon ink or stealth ink absorbing infrared light, the reading device 12 includes a light source for emitting infrared light, and a light-receiving element for outputting a reading signal RS according to the intensity of reflected light. According to such a configuration, the identification information ID itself is not visually recognized by the user, but is read as a portion where the intensity of the reflected light is low. The reading signal RS corresponding to the identification information ID may be an analog signal or a digital signal.

The tactile presentation device 10 includes a vibration source 13. The vibration source 13 is installed in the housing 11. The vibration source 13 is a device for generating vibration. The vibration source 13 can be implemented by a voice coil, an actuator, a piezoelectric element, an eccentric motor, and the like. The vibration generated by the vibration source 13 is presented to the user as a tactile sensation through the housing 11.

The tactile presentation device 10 includes a storage 14. The storage 14 stores vibration waveform information VW associated with the identification information ID. The vibration waveform information VW represents a waveform of the vibration generated by the vibration source 13. The storage 14 can be implemented by a semiconductor memory or the like.

The tactile presentation device 10 includes a control device 15. The control device 15 is installed in the housing 11. The control device 15 includes a reception interface 151. The reception interface 151 is configured as a hardware interface capable of receiving the reading signal RS outputted from the reading device 12. In a case where the reading signal RS is an analog signal, the reception interface 151 is equipped with an appropriate conversion circuit including an A/D converter.

The control device 15 includes a processor 152. The processor 152 is configured to read out the vibration waveform information VW associated with the identification information ID corresponding to the reading signal RS received by the reception interface 151 from the storage 14.

The control device 15 includes an output interface 153. The processor 152 is configured to output a control signal CS for causing the vibration source 13 to generate vibration corresponding to the vibration waveform information VW from the output interface 153. That is, the output interface 153 is configured as a hardware interface capable of outputting the control signal CS. The control signal CS may be a digital signal or an analog signal. In a case where the control signal CS is an analog signal, the output unit 153 is equipped with an appropriate conversion circuit including a D/A converter.

The vibration source 13 having received the control signal CS generates vibration corresponding to the vibration waveform information VW. The vibration is presented as a tactile sensation to the user holding the housing 11.

Referring to FIGS. 2 and 3, some specific exemplary operations of the tactile presentation device 10 configured as described above will be described.

A plurality of kinds of vehicles and a plurality of kinds of living creatures are depicted in the media content M illustrated in FIG. 2. An identification information ID for specifying the position of each picture in the media content M is provided in a portion where each picture is drawn. The storage 14 of the tactile presentation device 10 stores vibration waveform information VW corresponding to a traveling sound of each vehicle, and a voice sound of each living creature.

As an example, when the user causes the reading device 12 of the tactile presentation device 10 to approach a depicted dog, identification information ID corresponding to the position of the picture is read. The reading device 12 outputs a reading signal RS corresponding to the identification information ID as read. The reception interface 151 of the control device 15 receives the reading signal RS. The processor 152 of the control device 15 reads out vibration waveform information VW associated with the identification information ID corresponding to the reading signal RS from the storage 14. The vibration waveform information VW represents a vibration waveform corresponding to a voice sound of the dog. As a result, the position of the picture of the dog identified through the reading device 12 and the vibration waveform corresponding to the voice sound of the dog are associated with each other.

The processor 152 outputs a control signal CS for causing the vibration source 13 to generate vibration corresponding to the vibration waveform information VW from the output interface 153, while causing a sound source (not illustrated) to output the voice sound of the dog. The user who caused the tactile presentation device 10 to approach the depicted dog hears the voice sound of the dog and receives a tactile sensation corresponding to the voice sound of the dog.

As another example, when the user causes the reading device 12 of the tactile presentation device 10 to approach a depicted motorcycle, identification information ID corresponding to the position of the depicted motorcycle is read. The reading device 12 outputs a reading signal RS corresponding to the identification information ID as read. The reception interface 151 of the control device 15 receives the reading signal RS. The processor 152 of the control device 15 reads out vibration waveform information VW associated with the identification information ID corresponding to the reading signal RS from the storage 14. The vibration waveform information VW represents a vibration waveform corresponding to a traveling sound of the motorcycle. As a result, the position of the depicted motorcycle identified through the reading device 12 and the vibration waveform corresponding to the traveling sound of the motorcycle are associated with each other.

The processor 152 outputs a control signal CS for causing the vibration source 13 to generate vibration corresponding to the vibration waveform information VW from the output interface 153, while causing the sound source (not illustrated) to output the traveling sound of the motorcycle. The user who caused the tactile presentation device 10 to approach the depicted motorcycle hears the traveling sound of the motorcycle and receives a tactile sensation corresponding to the traveling sound of the motorcycle.

A circuit course is depicted in the media content M illustrated in FIG. 2. The circuit course includes a normal pavement section, a wooden bridge section, and a stone pavement section. In a portion where each section is depicted, identification information ID for specifying the position of the picture in the media content M is provided.

When the user moves the tactile presentation device 10 so as to trace the normal pavement section of the circuit course, identification information ID corresponding to the position of the normal pavement section is read by the reading device 12. The reading device 12 outputs a reading signal RS corresponding to the identification information ID as read. The reception interface 151 of the control device 15 receives the reading signal RS. In this case, the processor 152 of the control device 15 may be configured to output a control signal CS for causing the vibration source 13 to generate vibration corresponding to a traveling sound of a vehicle selected in advance from the output interface 153. In addition, the processor 152 may be configured to, when the tactile presentation device 10 traces the wooden bridge section or the stone pavement section, output a control signal CS for causing the vibration source 13 to generate vibration corresponding to a traveling sound modulated as if the vehicle is traveling over a wooden bridge or a stone pavement from the output interface 153.

For example, after the motorcycle is selected as described above, when the user traces the normal pavement section of the circuit course with the tactile presentation device 10, the processor 152 causes the sound source (not illustrated) to output a traveling sound of the motorcycle, and causes the vibration source 13 to generate vibration corresponding to the traveling sound. When the tactile presentation device 10 traces the wood bridge section, the traveling sound of the motorcycle outputted from the sound source changes as if it were crossing the wood bridge, and the tactile presented also changes. In a case where the user is an infant, not only it is possible to prompt the user to be interested in the living creatures or the vehicles, but also it is possible to prompt the user to acquire a technique of writing characters through an act of tracing a route.

In the media content M illustrated in FIG. 3, an orchestra is depicted. At a position where each of wind string instruments is depicted, identification information ID for specifying a position of the depicted instrument in the media content M is provided. The storage 14 of the tactile presentation device 10 stores vibration waveform information VW corresponding to a performance sound of each instrument.

As an example, when the user causes the reading device 12 of the tactile presentation device 10 to approach a depicted clarinet, identification information ID corresponding to the position of the depicted clarinet is read. The reading device 12 outputs a reading signal RS corresponding to the identification information ID as read. The reception interface 151 of the control device 15 receives the reading signal RS. The processor 152 of the control device 15 reads out vibration waveform information VW associated with the identification information ID corresponding to the reading signal RS from the storage 14. The vibration waveform information VW represents a vibration waveform corresponding to a performance sound of the clarinet. As a result, the position of the depicted clarinet identified through the reading device 12 and the vibration waveform corresponding to the performance sound of the clarinet are associated with each other.

The processor 152 outputs a control signal CS for causing the vibration source 13 to generate vibration corresponding to the vibration waveform information VW from the output interface 153, while causing the sound source (not illustrated) to output the performance sound of the clarinet. The user who caused the tactile presentation device 10 to approach the depicted clarinet hears the performance sound of the clarinet and receives a tactile sensation corresponding to the performance sound of the clarinet.

In the media content M illustrated in FIG. 3, a plurality of marks each designating a specific tune are provided. In a portion where each mark is provided, identification information ID for specifying the position of the mark in the media content M is provided.

When the user causes the tactile presentation device 10 to approach a mark representing a specific tune, identification information ID corresponding to the position of the mark is read by the reading device 12. The reading device 12 outputs a reading signal RS corresponding to the identification information ID as read. The reception interface 151 of the control device 15 receives the reading signal RS. In this case, the processor 152 of the control device 15 may be configured to output, from the output interface 153, a control signal CS for causing the vibration source 13 to generate vibration corresponding to a sound of the tune corresponding to the mark performed with an instrument selected in advance. In addition, the processor 152 may be configured to, when the user causes the tactile presentation device 10 to approach another depicted instrument during the performance of the tune, output a control signal CS for causing the vibration source 13 to overlap vibration corresponding to a performance sound of the instrument from the output interface 153.

For example, after the clarinet is selected as described above, when the user causes the tactile presentation device 10 to approach a mark indicating "TUNE1", the processor 152 causes the sound source (not illustrated) to output a sound of the clarinet performing the "TUNE1", and causes the vibration source 13 to generate vibration corresponding to the performance sound. Thereafter, when the user causes the tactile presentation device 10 to approach a depicted flute, a sound of the flute is overlapped with the performance of "TUNE1" outputted from the sound source, and a tactile sensation corresponding to the performance sound of the flute is presented in an overlapped manner. As a result, the user can experience a feeling as if he or she is directing an orchestra. In a case where the user is an infant, he or she can be prompted to gain a sense of sound and to be interested in concert.

A cooking guide can be another example of the media content M in which sounds and tactile sensations are presented in the overlapped manner every time another picture is selected. For example, the cooking guide may include pictures of foodstuffs and cookwares required for cooking a particular menu. The cookwares may include a knife, a frying pan, a pan, and the like. When the user selects a depicted specific foodstuff after selecting the depicted knife, the processor 152 causes the sound source (not illustrated) to output a sound for cutting the foodstuff, and causes the vibration source 13 to generate vibration corresponding to the cutting. When the user selects a specific depicted foodstuff after selecting the depicted frying pan, the processor 152 causes the vibration source 13 to output a sound for cooking the foodstuff, and also causes the vibration source 13 to generate vibration corresponding to the cooking. When the user further selects another foodstuff, a sound and vibration corresponding to the cooking of the another foodstuff are outputted in the overlapped manner. As a result, the user can feel as if he or she is cooking. In a case where the user is an infant, it is possible to prompt the user to understand the foodstuffs and the cooking method.

According to the configuration of the present embodiment, the tactile sensation to be presented a user through the vibration source 13 can be exhibited or changed in association with the position in the media content M. As a result, as a new application of the tactile presentation technique, it is possible to provide a user with an interesting experience related to media contents.

As illustrated in FIG. 6, the tactile presentation device 10 may include an acceleration detector 16. The acceleration detector 16 is configured to output an acceleration signal AS corresponding to acceleration applied to the housing 11 using a well-known technique. The acceleration signal AS may be a digital signal or an analog signal.

In this example, the reception interface 151 of the control device 15 is configured as a hardware interface capable of additionally receiving the acceleration signal AS. In a case where the acceleration signal AS is an analog signal, the reception interface 151 is equipped with an appropriate conversion circuit including an A/D converter.

In this example, the processor 152 of the control device 15 is configured to output a control signal CS for modulating the vibration generated by the vibration source 13 from the output interface 153 based on the acceleration signal AS received by the reception interface 151.

As an example, in the case of the media content M illustrated in FIG. 2, a change in the speed of which the tactile presentation device 10 traces the circuit course is detected by the acceleration detector 16. In a case where an increase of the tracing speed is detected, the processor 152 changes the traveling sound outputted from the sound source as if the selected vehicle is accelerated. In a case where a decrease of the tracing speed is detected, the processor 152 changes the traveling sound outputted from the sound source as if the selected vehicle is decelerated. The processor 152 also changes the vibration generated from the vibration source 13 in accordance with the change in the traveling sound.

As another example, in the case of the media content M illustrated in FIG. 3, the user can perform an operation of swinging the tactile presentation device 10 like a baton. A change in the swing speed of the tactile presentation device 10 is detected by the acceleration detector 16. In a case where an increase of the swing speed is detected, the processor 152 changes the performance sound of the tune outputted from the sound source so as to increase the tempo. In a case where a decrease of the swing speed is detected, the processor 152 changes the performance sound of the tune outputted from the sound source so as to decrease the tempo.

The processor 152 also changes the vibration generated from the vibration source 13 in accordance with the change in the performance sound.

According to the configuration as described above, the tactile sensation to be presented can be changed by associating the operation speed of the tactile presentation device and the media content M. Accordingly, an experience related to media contents can be provided to a user with increased variety.

The processor 152 of the control device 15 having each function described above can be implemented by an exclusive integrated circuit such as a microcontroller, an ASIC, and an FPGA capable of executing a computer program for performing a process corresponding to each function. In this case, the above-described computer program is pre-installed in a memory element included in the exclusive integrated circuit. The memory element is an example of a non-transitory computer-readable medium having stored a computer program. The memory element may serve as the storage 14.

The configuration of the present embodiment is merely illustrative for facilitating understanding of the presently disclosed subject matter. The configuration according to the present embodiment can be appropriately modified or changed without departing from the gist of the presently disclosed subject matter.

In the present embodiment, the storage 14 in which the vibration waveform information VW is stored is installed in the housing 11. However, as long as the tactile presentation device 10 can be equipped with a communication capability, the storage 14 can be provided outside the housing 11. In this case, the storage 14 may be implemented by a hard disk device or the like. The communication between the control device 15 and the storage 14 may be performed by wired communication or wireless communication.

In a case where the storage 14 is installed in the housing 11 as in the present embodiment, not only it is possible to suppress an increase in size and weight of the tactile presentation device 10 caused by the installation of the communication capability, but also it is possible to use the device independent of the communication environment.

In the present embodiment, as illustrated in FIG. 1, the housing 11 has a shape simulating a writing tool. The reading device 12 is provided at a position corresponding to the tip of the writing tool. According to such a configuration, the general operability of the tactile presentation device 10 is improved, so that the designation of a specific position in the media content M can be facilitated. However, based on a viewpoint of providing a user with an interesting experience related to media contents, the housing 11 may be configured to have an appropriate shape corresponding to the media content M.

In the above description, a sound source independent of the vibration source 13 is installed in the tactile presentation device 10. However, the vibration source 13 may also serve as the sound source.

Figure 7:
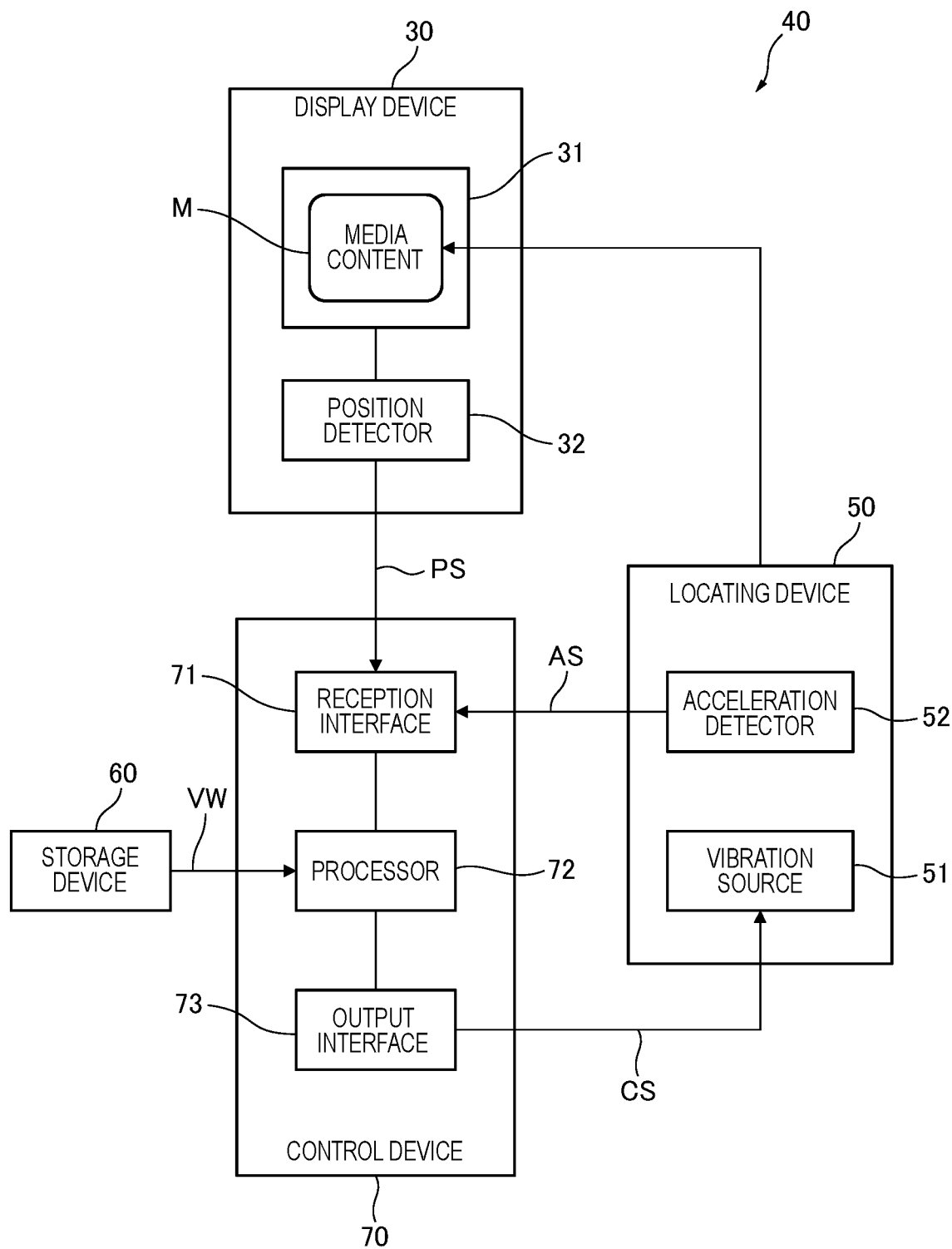
FIG. 7 illustrates a tactile presentation system according to a second embodiment.

FIG. 7 illustrates a functional configuration of a tactile presentation system 40 according to a second embodiment. The tactile presentation system 40 includes a display device 30, a locating device 50, a storage device 60, and a control device 70.

As described with reference to FIG. 3, the display device 30 includes a screen 31 on which the media content M is displayed.

The locating device 50 includes a housing having a shape capable of being held by a user, similarly to the tactile presentation device 10 illustrated in FIG. 1. The locating device 50 has a shape capable of designating a position in the media content M displayed on the screen 31 of the display device 30.

The display device 30 includes a position detector 32. The position detector 32 is configured to specify a position in the media content M designated by the locating device 50. Specifically, the surface of the screen 31 is configured to have a touch panel function. The touch panel function can be implemented by a pressure sensing method for detecting a pressure caused by contact of the locating device 50, an electrostatic capacitance method for detecting a change in the electrostatic capacitance caused by contact or approach of the locating device 50, or the like. A portion of the locating device 50 involved in the designation of the position in the media content M has a configuration corresponding to the method employed in the screen 31.

The position detector 32 is configured to output position information PS corresponding to the position in the media content M designated by the locating device 50. Specifically, the position information PS is configured to include coordinates of a position where the locating device 50 contacts or approaches in the screen 31. The position information PS may be in the form of digital data or analog data.

The locating device 50 includes a vibration source 51. The vibration source 51 can be implemented by a voice coil, an actuator, a piezoelectric element, an eccentric motor, and the like. The vibration generated by the vibration source 51 is presented to the user as a tactile sensation through the housing of the locating device 50.

The storage device 60 stores vibration waveform information VW associated with the position information PS. The vibration waveform information VW represents a waveform of the vibration generated by the vibration source 51. The storage device 60 can be implemented by a semiconductor memory, a hard disk device, or the like.

The control device 70 includes a reception interface 71. The reception interface 71 is configured as a hardware interface capable of receiving the position information PS outputted from the position detector 32 of the display device 30. In a case where the position information PS is an analog signal, the reception interface 71 is equipped with an appropriate conversion circuit including an A/D converter.

The control device 70 includes a processor 72. The processor 72 is configured to read out the vibration waveform information VW associated with the position information PS received by the reception interface 71 from the storage device 60.

The control device 70 includes an output interface 73. The processor 72 is configured to output control information CS for causing the vibration source 51 of the locating device 50 to generate vibration corresponding to the vibration waveform information VW from the output interface 73. That is, the output interface 73 is configured as a hardware interface capable of outputting the control information CS. The control information CS may be in the form of digital data or analog data. In a case where the control information CS is analog data, the output interface 73 is equipped with an appropriate conversion circuit including a D/A converter.

The vibration source 51 having received the control information CS generates vibration corresponding to the vibration waveform information VW. The vibration is presented as a tactile sensation to a user holding the housing of the locating device 50.

For example, in a case where the media content M illustrated in FIG. 2 is displayed on the display device 30, when the user causes the locating device 50 to approach a position where a dog is depicted, the position information PS indicative of the coordinates of the screen 31 corresponding to the position is outputted from the position detector 32. The reception interface 71 of the control device 70 receives the position information PS. The processor 72 of the control device 70 reads out vibration waveform information VW associated with the position information PS from the storage device 60. The vibration waveform information VW represents a vibration waveform corresponding to a voice sound of the dog. As a result, the position of the depicted dog designated by the locating device 50 and the vibration waveform corresponding to a voice sound of the dog are associated with each other.

The processor 72 outputs control information CS for causing the vibration source 51 to generate vibration corresponding to the vibration waveform information VW from the output interface 73, while causing a sound source (not illustrated) to output the voice sound of the dog. The user who caused the locating device 50 to approach the depicted dog hears the voice sound of the dog and receives a tactile sensation corresponding to the voice sound of the dog.

Other examples relating to the tactile presentation performed by the tactile presentation device 10 described with reference to FIGS. 2 and 3 are applicable to the tactile presentation performed by the locating device 50. Accordingly, repetitive descriptions for those will be omitted.

According to the configuration of the present embodiment, the tactile sensation to be presented a user through the vibration source 51 can be exhibited or changed in association with the position in the media content M. As a result, as a new application of the tactile presentation technique, it is possible to provide a user with an interesting experience related to media contents.

As illustrated in FIG. 7, the locating device 50 may include an acceleration detector 52. The acceleration detector 52 is configured to output acceleration information AS corresponding to the acceleration applied to the locating device 50 using a well-known technique. The acceleration information AS may be in the form of digital data or analog data.

In this example, the reception interface 71 of the control device 70 is configured as a hardware interface capable of additionally receiving the acceleration information AS. In a case where the acceleration information AS is in the form of analog data, the reception interface 71 is equipped with an appropriate conversion circuit including an A/D converter.

In this example, the processor 72 of the control device 70 is configured to output control information CS for modulating the vibration generated by the vibration source 51 from the output interface 73 based on the acceleration information AS received by the reception interface 71.

Other examples relating to the tactile modification performed by the tactile presentation device 10 described with reference to FIGS. 2 and 3 are applicable to the tactile modification performed by the locating device 50. Accordingly, repetitive descriptions for those will be omitted.

According to the configuration as described above, the tactile sensation to be presented can be changed by associating the operation speed of the locating device 50 and the media content M. Accordingly, an experience related to media contents can be provided to a user with increased variety.

The processor 72 of the control device 70 having various functions described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having recorded a computer program. The general-purpose microprocessor designates at least a part of the computer program stored in the ROM, loads the program on the RAM, and executes the processing described above in cooperation with the RAM. The above-described computer program may be pre-installed in the general-purpose memory, or may be downloaded from an external server device via a communication network and then installed in the general-purpose memory. In this case, the external server device is an example of the non-transitory computer-readable medium having stored the computer program.

The processor 72 may be implemented by an exclusive integrated circuit capable of executing the above-described computer program, such as a microcontroller, an ASIC, and an FPGA. In this case, the above-described computer program is pre-installed in a memory element included in the exclusive integrated circuit. The memory element is an example of a non-transitory computer-readable medium having stored a computer program. The processor 72 may also be implemented by a combination of a general-purpose microprocessor and an exclusive integrated circuit.

The storage device 60 and the control device 70 may be installed in the locating device 50 or the display device 30. Alternatively, the storage device 60 and the control device 70 may be installed in an independent device capable of communicating with the display device 30 and the locating device 50 via a communication network.

In a case where the storage device 60 and the control device 70 are installed in the locating device 50, since the tactile presentation is performed when once the position information PS outputted from the position detector 32 of the display device 30 is transmitted to the locating device 50, it is possible to suppress the amount of communication performed between the display device 30 and the locating device 50 to a necessary minimum.

In a case where the storage device 60 and the control device 70 are installed in the display device 30, the locating device 50 can perform the tactile presentation as long as at least the vibration source 51 adapted to operate in response to the control information CS is provided. Accordingly, the configuration of the locating device 50 can be simplified. As a result, it is possible to suppress an increase in size and weight of the locating device 50. In addition, in a case where the display device 30 is a general-purpose device such as a portable information terminal, a processor having a sufficient processing capability and/or a memory having a sufficient storage capacity can be used, so that it is possible to suppress a decrease in the responsiveness of the tactile presentation.

In a case where the storage device 60 and the control device 70 are installed in independent devices, it is possible to improve the flexibility with respect to the update of the computer program to be executed by the processor 72 and/or the vibration waveform information VW. This fact may be the same as in a case where the storage device 60 and the control device 70 are installed in the display device 30 as a general-purpose device capable of downloading a computer program and data from an external device through a communication network.

The configuration of the present embodiment is merely illustrative for facilitating understanding of the presently disclosed subject matter. The configuration according to the present embodiment can be appropriately modified or changed without departing from the gist of the presently disclosed subject matter.

In the above description, a sound source independent of the vibration source 51 is installed in the locating device 50. However, the vibration source 51 may also serve as the sound source. Alternatively, the sound source may be installed in the display device 30.

The present application is based on Japanese Patent Application No. 2020-114178 filed on Jul. 1, 2020, the entire contents of which are incorporated herein by reference.

The invention claimed is:

1. A tactile presentation system, comprising:
   a display capable of displaying a media content;
   a tactile presentation device having a shape capable of being held by a user;
   a reading device installed in the tactile presentation device and configured to read one of multiple identification information items that are respectively associated with multiple portions in a course illustrated in a media content;
   a vibration source installed in the tactile presentation device and capable of generating vibration;
   a sound source installed in at least one of the display device and the tactile presentation device; and
   a control device installed in the tactile presentation device and configured to specify one of multiple vibration waveform information items that is associated with one of the identification information items, and to cause the vibration source to generate vibration corresponding to the one of the vibration waveform information items,
   wherein the control device is configured to cause the sound source to generate first sound while causing the vibration source to generate a first vibration that corresponds to first vibration waveform information item included in the multiple vibration waveform information items, in a case where a first identification information item included in the multiple identification information items is read out by tracing a first portion included in the multiple portions with the reading device, and
   wherein the control device is configured to cause the sound source to generate second sound that is different from the first sound while causing the vibration source to generate second vibration that is different from the first vibration and corresponds to a second vibration waveform information item included in the multiple vibration waveform information items, in a case where a second identification information item included in the multiple identification information items is read out by tracing a second portion included in the multiple portions with the reading device.

2. The tactile presentation system according to claim 1, further comprising:
   an acceleration detector installed in the tactile presentation device and configured to output an acceleration signal corresponding to acceleration applied to the housing,
   wherein the control device configured to cause the vibration source to change the vibration in accordance with the acceleration signal.

3. The tactile presentation system according to claim 1, further comprising:
   a storage installed in the tactile presentation device and storing the vibration waveform information.

4. The tactile presentation system according to claim 1,
wherein the tactile presentation device has a shape simulating a writing tool; and
wherein the reading device is disposed at a position corresponding to a tip end of the writing tool.

5. A control device adapted to be installed in a tactile presentation device having a shape capable of being held by a user, the control device comprising:
a reception interface configured to receive one of multiple identification information items that are respectively associated with multiple portions in a course illustrated in a media content; and
a processor configured to specify one of multiple vibration waveform information items that is associated with one of the identification information items, and to cause a vibration source to generate vibration corresponding to the one of the vibration waveform information items,
wherein the processor is configured to cause a sound source to generate first sound while causing the vibration source to generate a first vibration that corresponds to first vibration waveform information item included in the multiple vibration waveform information items, in a case where a first identification information item included in the multiple identification information items is read out by tracing a first portion included in the multiple portions with a reading device, and
wherein the processor is configured to cause the sound source to generate second sound that is different from the first sound while causing the vibration source to generate second vibration that is different from the first vibration and corresponds to a second vibration waveform information item included in the multiple vibration waveform information items, in a case where a second identification information item included in the multiple identification information items is read out by tracing a second portion included in the multiple portions with the reading device.

6. A non-transitory computer-readable medium having stored a computer program adapted to be executed by a processor installed in a control device that is adapted to be installed in a tactile presentation device having a shape capable of being held by a user, the computer program being configured to, when executed, to cause the control device to:
receive one of multiple identification information items that are respectively associated with multiple portions illustrated in a media content;
specify one of multiple vibration waveform information items that is associated with the one of the identification information items;
cause a vibration source to generate vibration corresponding to the one of the vibration waveform information items;
cause a sound source to generate first sound while causing the vibration source to generate first vibration that corresponds to a first vibration waveform information item included in the multiple vibration waveform information items, in a case where a first identification information item included in the multiple identification information items is read out by tracing a first portion included in the multiple portions with a reading device; and
cause the sound source to generate second sound that is different from the first sound while causing the vibration source to generate second vibration that is different from the first vibration and corresponds to a second vibration waveform information item included in the multiple vibration waveform information items, in a case where a second identification information item included in the multiple identification information items is read out by tracing a second portion included in the multiple portions with the reading device.

7. A tactile presentation system, comprising:
a display device capable of displaying a media content;
a locating device having a shape capable of being held by a user and configured to designate a combination of one of multiple pictures and one of multiple courses illustrated in the media content;
a position detector installed in the display device and configured to output position information corresponding to positions of the one of the pictures and the one of the courses designated by the locating device;
a vibration source installed in the locating device;
a sound source installed in at least one of the display device and the locating device;
a storage device storing multiple first vibration waveform information items that are associated with the multiple pictures and multiple second vibration waveform information items that are associated with the multiple courses;
a control device configured to cause the sound source to generate sound corresponding to the combination designated by the locating device while causing the vibration source to generate vibration corresponding to a combination of one of the first vibration waveform information items and the second vibration waveform information items based on the combination designated by the locating device; and
an acceleration detector configured to output acceleration information corresponding to acceleration applied to the locating device,
wherein the control device is configured to cause the sound source to change the sound while causing the vibration source to change the vibration in accordance with the acceleration information.

8. The tactile presentation system according to claim 7,
wherein the control device and the storage device are installed in the locating device.

9. The tactile presentation system according to claim 7,
wherein the control device and the storage device are installed in the display device.

10. A control device, comprising:
a reception interface configured to receive position information corresponding to a combination of positions of one of multiple pictures and one of multiple courses illustrated in a media content that is displayed by a display device and designated by a locating device; and
a processor configured to cause, based on the position information, a sound source installed in at least one of the display device and the locating device to generate sound corresponding to the combination while causing a vibration source installed in the locating device to generate vibration corresponding to a combination of one of first multiple vibration waveform information items that is associated with the one of the multiple pictures and one of second vibration waveform information items that is associated with the one of the multiple courses,
wherein the reception interface is configured to receive acceleration information corresponding to acceleration applied to the locating device, and
wherein the processor configured to cause the sound source to change the sound while causing the vibration source to change the vibration in accordance with the acceleration information.

11. A non-transitory computer-readable medium having stored a computer program adapted to be executed by a processor installed in a control device, the computer program being configured to, when executed, to cause the control device to:
- receive position information corresponding to a combination of positions of one of multiple pictures and one of multiple courses illustrated in a media content that is displayed by a display device and designated by a locating device;
- based on the position information, cause a sound source installed in at least one of the display device and the locating device to generate sound corresponding to the combination while causing a vibration source installed in the location device to generate vibration corresponding to a combination of one of first multiple vibration waveform information items that is associated with one of the multiple pictures and one of second vibration waveform information items that is associated with the one of the multiple courses;
- receive acceleration information corresponding to acceleration applied to the locating device; and
- cause the sound source to change the sound while causing the vibration source to change the vibration in accordance with the acceleration information.

* * * * *